May 5, 1925.
Re. 16,065
W. T. HANNA
AUTOMATIC STOKER
Original Filed Dec. 11, 1920 4 Sheets-Sheet 1
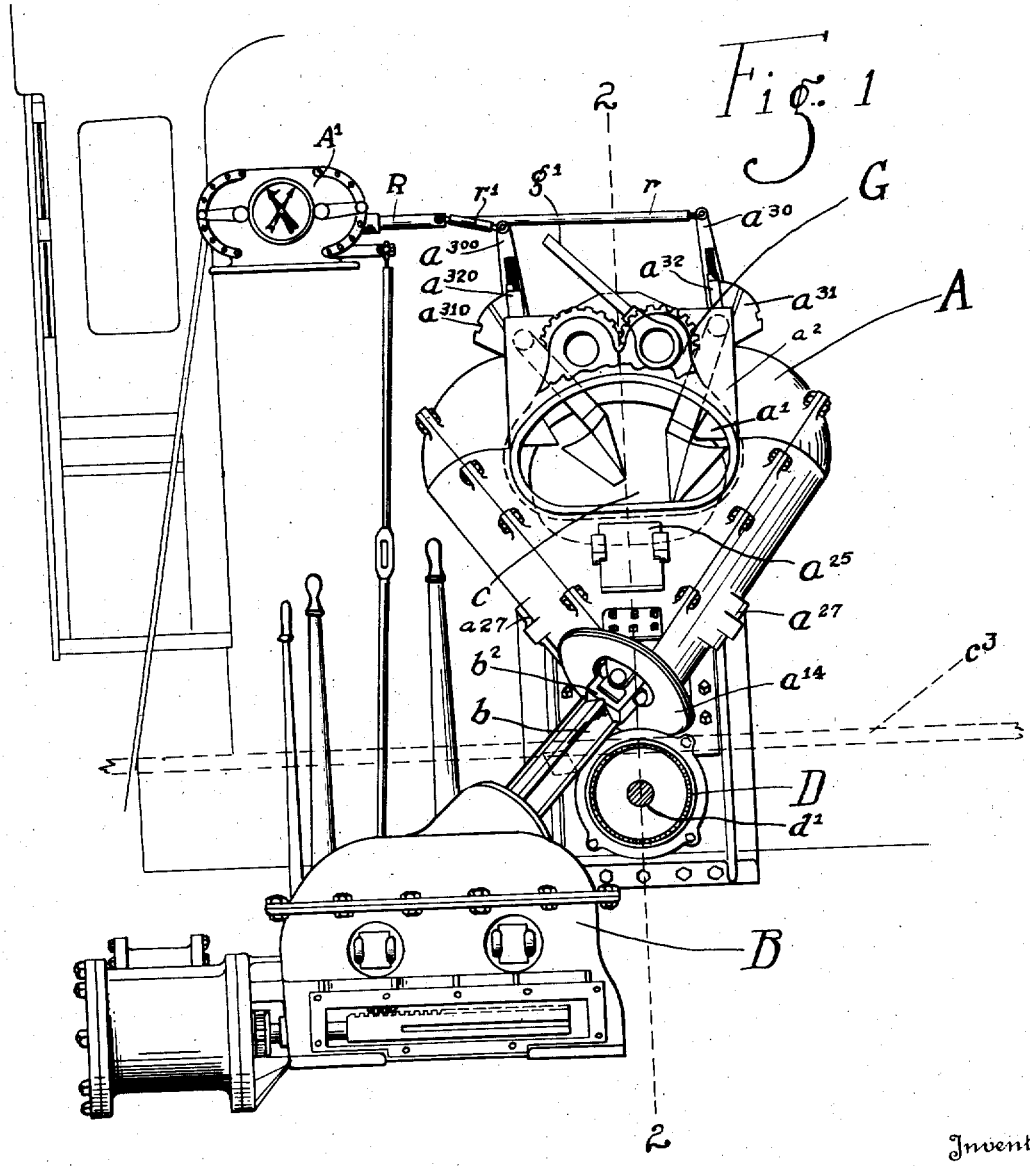
Inventor
William T. Hanna
By Murray & Ingelter
Attorneys.

May 5, 1925.
Re. 16,065
W. T. HANNA
AUTOMATIC STOKER
Original Filed Dec. 11, 1920 4 Sheets-Sheet 2
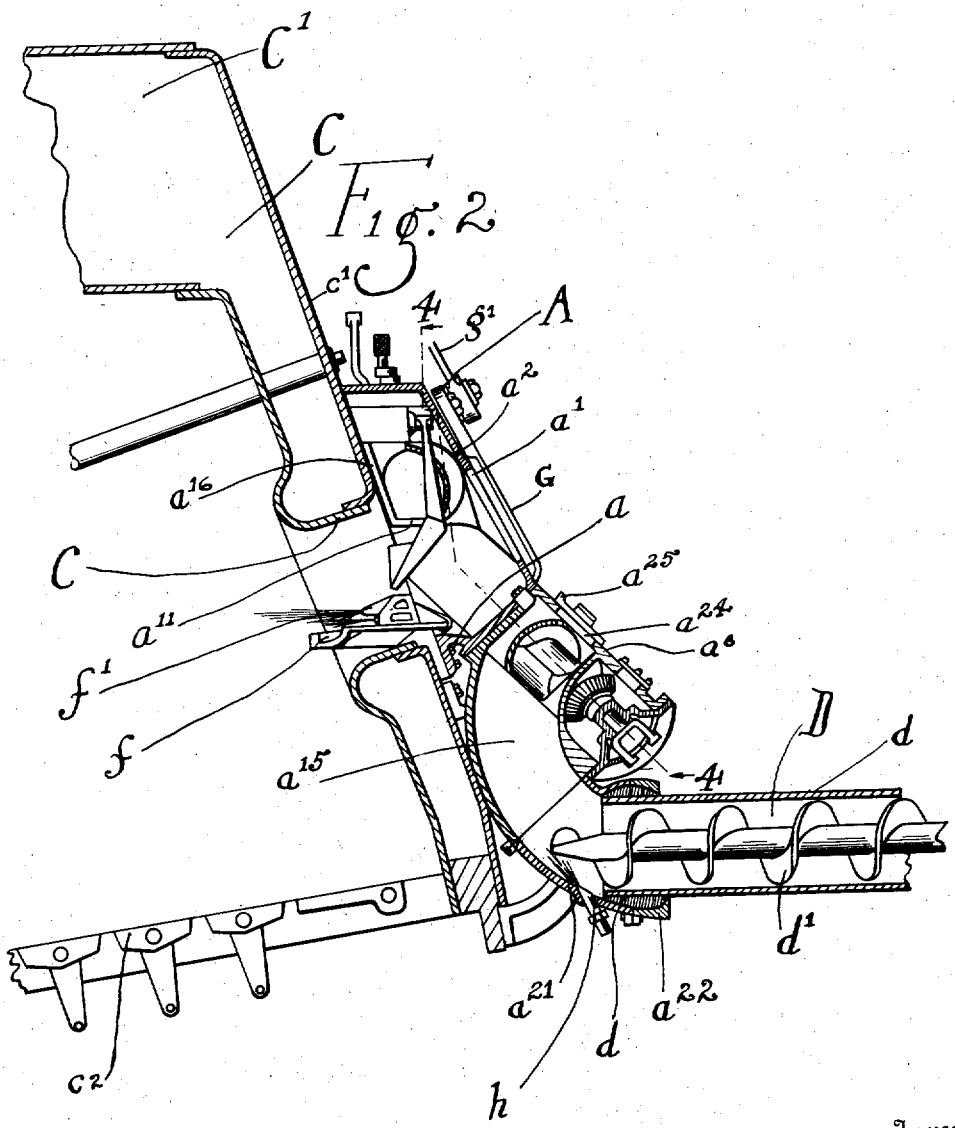
Inventor
William T. Hanna
By Murray and Geyelin
Attorneys May 5, 1925.
Re. 16,065
W. T. HANNA
AUTOMATIC STOKER
Original Filed Dec. 11, 1920 4 Sheets-Sheet 3
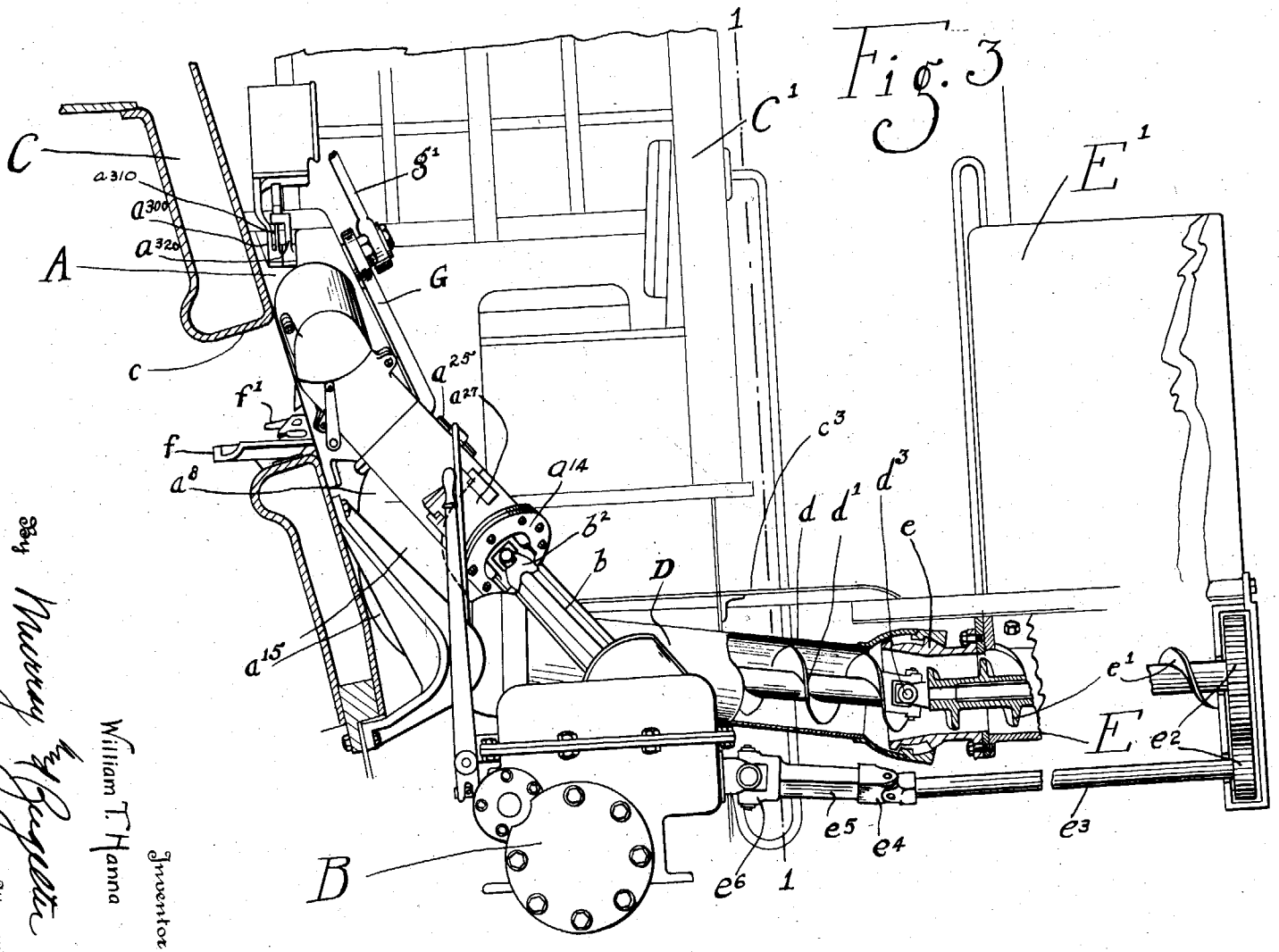
Inventor
William T. Hanna
By Murray and Bugbee
Attorneys.

May 5, 1925.
Re. 16,065
W. T. HANNA
AUTOMATIC STOKER
Original Filed Dec. 11, 1920 4 Sheets-Sheet 4
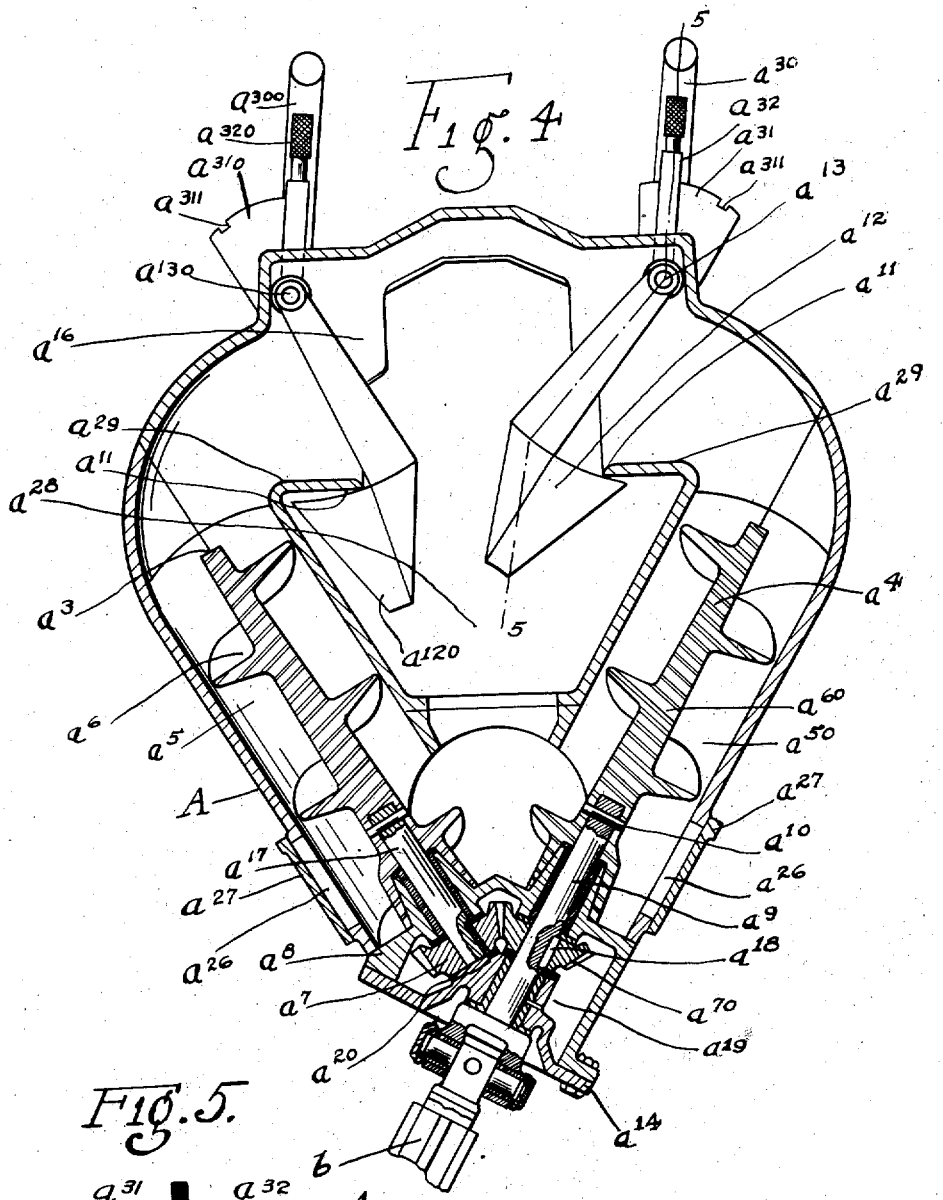
Fig. 5.
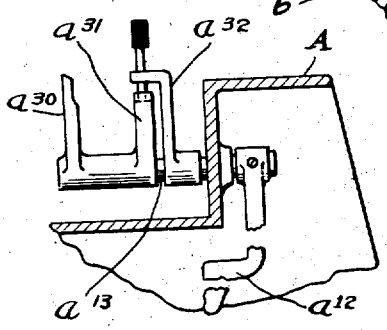
Inventor
William T. Hanna
By Murray and Jugelter
Attorneys.

Reissued May 5, 1925. Re. 16,065

UNITED STATES PATENT OFFICE.

WILLIAM T. HANNA, OF CINCINNATI, OHIO.

AUTOMATIC STOKER.

Original No. 1,497,014, dated June 10, 1924, Serial No. 430,020, filed December 11, 1920. Application for reissue filed March 13, 1925. Serial No. 15,384.

*To all whom it may concern:*

Be it known that I, WILLIAM T. HANNA, a citizen of the United States of America, and resident of Cincinnati, in the county of Hamilton and State of Ohio, have invented a new and useful Improvement in Automatic Stokers, of which the following is a specification.

An object of my invention is to provide a compact and efficient stoker especially adaptable to locomotives, that may be readily mounted on a locomotive.

Another object is to provide a device of the type referred to and for the purpose stated in which substantially all of the driving mechanisms are disposed below the floor of the engine cab.

These and other objects are attained by the means described herein and disclosed in the accompanying drawing in which:

Fig. 1 is an elevation taken on line 1—1 of Fig. 3, parts being broken away and showing a device embodying my invention, mounted on a locomotive.

Fig. 2 is a sectional view on line 2—2 of Fig. 1.

Fig. 3 is a side elevational view, looking to the right on Fig. 1, parts being broken away.

Fig. 4 is an enlarged sectional view on line 4—4 of Fig. 2.

Fig. 5 is an enlarged sectional view on line 5—5 of Fig. 4.

The stoker of my invention comprises a housing A, which surrounds the usual firing opening, a fuel conduit $a^{15}$, which enters the lower end of the housing, a feeder D which carries fuel to the fuel conduit from the tender E′ and forces it upward in the conduit, and elevating and distributing mechanism in housing A. Housing A contains within it the elevating conveyors $a^3$ and $a^4$ to the lower ends of which conveyors the fuel is fed by the conveyors E and D. The housing together with the elevating conveyors are adapted to be mounted about and adjacent to the door of the locomotive fire box. Housing A is preferably pear shaped having upwardly and outwardly diverging sides and is secured upon the boiler C of the locomotive C′ above the cab floor $c^3$ by any suitable means such as bolts $a$, and has a secondary firing opening $a'$ in its rear wall $a^2$ and an aperture $a^{28}$ formed in the front wall $a^{16}$ of the housing. The aperture $a^{28}$ and secondary firing opening $a'$ are substantially in horizontal alignment with the primary firing opening $c$ in the boiler, which is located in alignment with the longitudinal centerline of the grate $c^2$. Contained within the housing A and disposed between the rear wall $a^2$ and the forward wall $a^{16}$ thereof are the elevating conveyors $a^3$ and $a^4$. The forward wall $a^{16}$ of housing A engages and is mounted upon the rear outer wall $c'$ of the boiler C. The elevating conveyors comprise the tubes $a^5$ and $a^{50}$ forming part of housing A and the spiral screws $a^6$ and $a^{60}$ rotatably mounted therein. The spiral screws are driven by any suitable means such as the driving mechanism B that is preferably disposed below the cab floor $c^3$. The driving mechanism may be of any type adapted to impart rotatory motion. The drive mechanism B has extending therefrom a drive shaft $b$, adapted to revolve the shaft $a^9$ upon which is mounted the screw $a^{60}$. Shaft $a^9$ drives the shaft $a^{17}$ by means of the beveled gears $a^7$ and $a^{70}$ mounted on the shafts $a^{17}$ and $a^9$ respectively by means of the keys $a^{18}$. The beveled gears $a^7$ and $a^{70}$ are contained within the supplemental housing $a^8$ formed at the base of the housing A and through which the shafts $a^9$ and $a^{17}$ extend. The spiral screws are mounted fixedly on the shafts $a^9$ and $a^{17}$ by means of the pins $a^{10}$ whereby the shafts $a^9$ and $a^{17}$ and the screws $a^6$ and $a^{60}$ are operated in unison from a common driving mechanism. The supplemental housing $a^8$ forms a base or bottom for the tubes $a^5$ and $a^{50}$ and is formed integral with the conduit $a^{15}$. A plate $a^{14}$ is secured to the base of the supplemental housing $a^8$ and forms a closure for the chamber $a^{19}$ within which the gears $a^7$ and $a^{70}$ are contained. The shaft $a^9$ extends through the plate $a^{14}$ to a point without the housing A at which it is attached to drive shaft $b$ of the drive mechanism B by means of a universal joint $b^2$. An end bearing $a^{20}$ is mounted upon the plate $a^{14}$ within the chamber $a^{19}$ and serves as an abutment for shaft $a^{17}$ and the gear mounted thereon. The upper ends of the tubes $a^5$ and $a^{50}$ are enlarged and have angular shoulders $a^{29}$ formed thereon. The inner and bottom edges $a^{11}$ of the shoulders $a^{29}$ extend over the adjustable distributing chutes $a^{12}$ and $a^{120}$ mounted on the rocking shafts $a^{13}$ and $a^{130}$ which shafts are carried by the housing A. The chutes are controlled by means of the arms $a^{30}$ and $a^{300}$ having sleeves rotatably mounted on the shafts $a^{13}$ and $a^{130}$. Lug plates $a^{31}$ and $a^{310}$ are carried by arms $a^{30}$ and $a^{300}$ and may be engaged by lugs formed on the handles $a^{32}$ and $a^{320}$, said handles having hubs mounted on the shafts $a^{13}$ and $a^{130}$. When it is desired to render the chutes inoperative, the lugs are disengaged from the lug plates, wherefore when the handles are rotated, the chutes may be swung clear of the shoulders $a^{29}$ so as not to interfere with hand stoking through the housing and the primary feeding opening. The chutes may be oscillated above their pivotal mountings by means of the controlling device A′, to the reciprocating shaft R of which, the arms $a^{30}$ and $a^{300}$ are pivotally connected by suitable links $r$ and $r'$. The lug plates are provided with spaced slots $a^{311}$ in which the handles may engage, as shown in Fig. 5, whereby to transmit motion between the handles, and to vary the arcs through which the chutes $a^{12}$ and $a^{120}$ may be oscillated. Further explanation of the chutes is deemed unnecessary as the action thereof is fully explained in my copending application Serial Number 308,-851 and need not therefore be more specifically described herein. The ways or bores formed in tubes $a^5$ and $a^{50}$, communicate adjacent their lower ends with the conveyor D by means of the conduit $a^{15}$. A casing $a^{21}$ is secured to the supplemental housing $a^8$ and extends below the cab floor $c^3$ and provides the lower terminus of the conduit $a^{15}$. A ball and socket joint $a^{22}$ connects the rear end of the casing $a^{21}$ and the forward end of the casing $d$ that surrounds the conveyor screw $d^1$.

An observation door $a^{24}$ is formed in the rear of the housing A immediately below the opening $a'$ such door opening into the tubes $a^5$ and $a^{50}$ at their bases. A plate $a^{25}$ is adapted to form a closure for the observation door. By means of the observation door, the operator can watch the fuel fed to the furnace and can remove any slack or other non-combustible or deleterious material. Apertures $a^{26}$, see Fig. 4, are formed in the sides of the casing, adjoining the base of the tubes $a^5$ and $a^{50}$ to facilitate assemblage and to facilitate removing of any obstructions in the tubes. The plates $a^{27}$ form closures for the apertures $a^{26}$.

The conveyor D comprises a tubular casing $d$ within which is mounted a spiral screw $d'$. The conveyor E comprises the tubular casing $e$ mounted on the tender E′ and which commuicates with the supply of fuel in the tender in any manner common in the art and a spiral screw $e'$ is revolubly and centrally mounted within the tubular casing $e$ in any manner well known in the art. The conveyors are disposed below the cab floor $c^3$. The tubular member $e$ is adapted to be connected with and to extend into the rear end of the tubular casing $d$ of the conveyor D, in a manner well known in the art. The spiral screw $d'$ is connected with the spiral screw $e'$ by means of a universal joint $d^3$. The spiral screw $e'$ is driven by means of gears $e^2$, mounted on the tender, one of said gears $e^2$ being driven by drive shaft $e^3$, which shaft is connected by universal joint $e^4$ to the driving shaft $e^5$, which shaft is connected by a universal joint $e^6$ to the driving mechanism B. The second gear is mounted on the shaft carrying the spiral screw $e'$.

Mounted between the housing A and the rear wall of the boiler C and extending through the primary firing opening is the distributor plate $f$. Mounted adjacent and extending over the distributor plate $f$ are a series of ejector nozzles $f'$ adapted, together with the distributor plate, to feed the fuel evenly over the bed of the furnace, which nozzles are preferably of the type illustrated and explained in my copending application, Serial Number 377,336, and which therefore require no further explanation or description. The doors G are pivotally mounted on the housing A and normally close the opening $a'$ in the housing. The doors are provided at their upper ends with meshing gear segments, whereby when one of the doors is rotated about its pivotal mounting, the other door is also rotated. Any suitable means such as a lever $g'$ fastened to one of the doors may be employed to open and close the doors. The doors may be opened either manually or automatically, as described in my said copending application.

In operation the screws $e'$ and $d'$ carry the fuel from the conveyor D and force it through the conduit $a^{15}$ and into the tubes $a^5$ and $a^{50}$. The shaft $a^9$ is rotated by the drive mechanism B whereby the spiral screws mounted within the tubes $a^5$ and $a^{50}$ carry the fuel upward through the tubes $a^5$ and $a^{50}$ and push the fuel over the shoulders $a^{29}$ whereupon the fuel falls upon the chutes $a^{12}$ and $a^{120}$ and is guided by means of the chutes to the desired position above the distributor plate $f$ and the ejector $f'$. As the fuel falls upon the ejector and the distributor plate, the fuel is carried by jets of air or steam to various parts of the grate of the locomotive.

Should the stoker fail, the chutes may be swung to an inoperative position as heretofore described and the boiler can be fired through the aperture $a^{28}$ in the housing and through the firing openings in the boiler and housing.

As an auxiliary means adapted to cooperate with the conveyors E and D, in moving the fuel through the conduit $a^{15}$, I provide a blast nozzle or series of nozzles $h$ which extend into the conduit $a^{15}$, and by means of which a blast of air or steam may be introduced into the conduit $a^{15}$ to assist in conveying the fuel upward through the conduit and into the elevating conveyors in the housing A.

What I claim is:

1. In a locomotive stoker the combination of a fire-box, having a firing opening located in alignment with its longitudinal axis, a housing embracing the firing opening, a distributing plate mounted adjacent the housing and extending into the firing opening, a chute mounted pivotally within the housing and adapted to direct fuel to the distributing plate, and means within the housing for feeding fuel to the chute.

2. In a locomotive stoker the combination with a fire-box having a primary firing opening, of a housing having an aperture in its forward wall registering with the primary firing opening, a distributor plate extending into the primary firing opening, a chute mounted pivotally within the housing and projecting over the distributor plate, and means within the housing for feeding fuel to the chute.

3. In a locomotive stoker the combination with a fire-box, having a primary firing opening, of a housing having an aperture in its forward wall registering with the primary firing opening, a distributor plate extending into the primary firing opening, a chute mounted pivotally within the housing and projecting over the distributor plate, means within the housing for feeding fuel to the chute and means to supply fuel to the fuel feeding means.

4. In a locomotive stoker the combination with a fire-box, having a primary firing opening, of a housing having an aperture in its forward wall registering with the primary firing opening, elevating conveyors within the housing adapted to carry fuel from the base of the housing to points near the top thereof, and a chute pivotally mounted within the housing adapted to direct fuel from the top of the conveyor through the aperture in the housing and through the primary firing opening.

5. In a locomotive stoker the combination with a fire-box, having a primary firing opening, of a housing having an aperture in its forward wall registering with the primary firing opening, and having a secondary firing opening in its rear wall and in substantial alignment with the primary firing opening and the aperture, an elevating conveyor within the housing adapted to carry fuel from the base of the housing to points near the top thereof, and a chute pivotally mounted within the housing adapted to direct fuel from the top of the conveyor through the aperture in the housing and through the primary firing opening.

6. In a locomotive stoker the combination with a fire-box, having a primary firing opening, of a housing having an aperture in its forward wall registering with the primary firing opening, and having a secondary firing opening in its rear wall and in substantial alignment with the primary firing opening and the aperture, an elevating conveyor within the housing adapted to carry fuel from the base of the housing to points near the top thereof, a chute pivotally mounted within the housing adapted to direct fuel from the top of the conveyor through the aperture in the housing and through the primary firing opening, and means to feed fuel to the elevating conveyor.

7. In a locomotive stoker the combination of a fire-box having a primary firing opening, a housing embracing the firing opening and having in its front and rear an aperture and a secondary firing opening respectively in alignment with the primary opening, a door for the secondary opening, a distributor plate extending into the primary firing opening, a chute mounted pivotally within the housing adapted to direct fuel to the distributor plate and means within the housing for feeding fuel to the chute.

8. In a stoker mechanism, the combination of a fire-box having a firing opening in its wall, a housing mounted adjacent to and extending about the firing opening, an ejector mounted adjacent the firing opening and adapted to direct fuel into the fire box, a chute mounted pivotally within the housing adapted to direct fuel to the ejector and means within the housing for feeding fuel to the chute.

9. In a stoker mechanism the combination of a fire-box having a firing opening in its wall, a housing mounted adjacent to and extending about the firing opening, a distributor plate adjacent the firing opening, an ejector adjacent the distributor plate adapted to direct fuel into the fire box, a chute mounted pivotally within the housing adapted to direct fuel to the ejector and distributor plate, and means within the housing for feeding fuel to the chute.

10. In a stoker mechanism the combination of a housing having a chamber, adapted to be mounted adjacent to and to embrace a firing opening, the housing having upwardly extending ways formed in it, the ways extending above the firing opening and communicating at their tops with the chamber, pivotally mounted chutes within the chamber projecting below the tops of the ways, a supplemental housing below the first mentioned housing having a fuel conduit communicating with the lower ends of the ways, a revoluble drive shaft extending through the supplemental housing into one of the ways, a driven shaft extending into the supplemental housing and into a second one of the ways, means within the supplemental housing for transmitting motion from the drive shaft to the driven shaft, and spiral screws within the ways mounted upon the drive and driven shafts.

11. In a stoker mechanism the combination of a housing having a chamber therein, adapted to be mounted adjacent to and to embrace a firing opening, and having upwardly extending ways formed in it, the ways extending above such firing opening and communicating at their tops with the chamber, pivotally mounted chutes within the housing projecting below the tops of the ways, a supplemental housing forming a base for the first mentioned housing, having a chamber formed within it, the supplemental housing having a fuel conduit formed in it, the fuel conduit communicating with the lower ends of the ways, a revoluble drive shaft extending through the walls of the supplemental housing and the chamber therein, and projecting into one of the ways, a driven shaft extending through a wall of the supplemental housing projecting into the supplemental housing chamber and into a second one of the ways, means within the last mentioned chamber adapted to transmit motion from the the drive shaft to the driven shaft, and means to rotate the drive shaft.

12. In a locomotive stoker the combination of a fire box, having a firing opening located in alignment with its longitudinal axis, a housing embracing the firing opening, a distributing plate mounted adjacent the housing and extending into the firing opening, a pivotally mounted chute within the housing and adapted to direct fuel to the distributing plate, means within the housing for feeding fuel to the chute, and means to oscillate the chute about its pivotal mounting.

13. In a locomotive stoker the combination with a fire box having a firing opening, of a housing having an aperture in its forward wall registering with the firing opening, a distributor plate extending into the firing opening, a pivotally mounted chute within the housing and projecting over the distributor plate, means within the housing for feeding fuel to the chute, and means to oscillate the chute about its pivotal mounting.

14. In a locomotive stoker the combination with a fire box, having a firing opening, of a housing having an aperture in its forward wall registering with the firing opening, a distributor plate extending into the firing opening, a pivotally mounted chute within the housing and projecting over the distributor plate, means within the housing for feeding fuel to the chute, means to supply fuel to the fuel feeding means, and means to oscillate the chute about its pivotal mounting.

15. In a stoker mechanism the combination of a furnace having a firing opening in its wall, a housing mounted upon the exterior of the furnace and embracing the firing opening, means associated with the furnace and the housing for feeding fuel to the furnace by way of the firing opening therein, a pivotally mounted chute within the housing adapted to direct fuel to the feeding means, means within the housing for conveying fuel to the chute, and means to oscillate the chute about its pivotal mounting.

16. In a locomotive stoker the combination of a fire-box having a primary firing opening, a housing embracing the firing opening and having an aperture and a secondary firing opening therein in alignment with the primary opening, a door for the secondary opening, a distributor plate extending into the primary firing opening, a pivotally mounted chute within the housing adapted to direct fuel to the distributor plate, means within the housing for feeding fuel to the chute, and means to oscillate the chute about its pivotal mounting.

17. In a stoker mechanism the combination of a housing having a chamber, adapted to be mounted adjacent to and to embrace a firing opening, the housing having upwardly extending ways therein communicating at their tops with the chamber, pivotally mounted chutes within the chamber projecting below the tops of the ways, a supplemental housing having a fuel conduit communicating with the lower ends of the ways, a revoluble drive shaft extending through the supplemental housing into one of the ways, a driven shaft extending into the supplemental housing and into a second one of the ways, means within the supplemental housing for transmitting motion from the drive shaft to the driven shaft, and spiral screws within the ways mounted upon the drive and driven shafts.

18. In combination, with a furnace having a fuel feed opening in a wall thereof, a housing mounted externally on the wall and embracing the fuel feed opening, means adapted to supply fuel to the side of the housing and of the fuel feed opening, distributors mounted in the housing and adapted to receive the fuel at the sides of the housing and to direct it to the fuel feed opening, and means for actuating the distributors.

In testimony whereof, I have hereunto subscribed my name this 11th day of March, 1925.

WILLIAM T. HANNA.